United States Patent
Hosoda (10) Patent No.: US 9,435,272 B2
(45) Date of Patent: Sep. 6, 2016

(54) INTERNAL COMBUSTION ENGINE AND CONTROL APPARATUS OF THE INTERNAL COMBUSTION ENGINE

(71) Applicant: Fuminori Hosoda, Toyota (JP)

(72) Inventor: Fuminori Hosoda, Toyota (JP)

(73) Assignee: TOYOTA JIDOSHA KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/437,020

(22) PCT Filed: Oct. 25, 2012

(86) PCT No.: PCT/JP2012/077539
§ 371 (c)(1),
(2) Date: Apr. 20, 2015

(87) PCT Pub. No.: WO2014/064789
PCT Pub. Date: May 1, 2014

(65) Prior Publication Data
US 2015/0285162 A1 Oct. 8, 2015

(51) Int. Cl.
*F01L 1/34* (2006.01)
*F02D 13/02* (2006.01)
*F01L 13/00* (2006.01)
F01L 1/18 (2006.01)
F01L 1/24 (2006.01)
F01L 1/26 (2006.01)
F01L 1/053 (2006.01)

(52) U.S. Cl.
CPC ........... *F02D 13/0207* (2013.01); *F01L 13/00* (2013.01); *F01L 13/0063* (2013.01); *F01L 1/185* (2013.01); F01L 1/2405 (2013.01); F01L 1/267 (2013.01); F01L 2001/0537 (2013.01); F01L 2105/00 (2013.01); F01L 2800/08 (2013.01); F01L 2820/032 (2013.01); Y02T 10/18 (2013.01)

(58) Field of Classification Search
CPC ............. Y02T 10/18; F02D 2041/001; F02D 13/0207; F01L 13/0063; F01L 1/185; F01L 2001/0537; F01L 2800/00
USPC ...................... 123/90.15, 90.16, 90.17, 90.18
See application file for complete search history.

(56) References Cited

U.S. PATENT DOCUMENTS

| 5,429,079 | A | * | 7/1995 | Murata | F01L 1/267 123/54.4 |
| 2002/0066435 | A1 | * | 6/2002 | Okamoto | F02D 11/107 123/396 |
| 2005/0039723 | A1 | * | 2/2005 | Miura | F01L 13/0026 123/435 |
| 2005/0188929 | A1 | * | 9/2005 | Kawamura | F02D 13/02 123/90.15 |
| 2006/0213469 | A1 | * | 9/2006 | Ezaki | F01L 1/022 123/90.16 |
| 2007/0157896 | A1 | * | 7/2007 | Fuwa | F01L 1/185 123/90.16 |

FOREIGN PATENT DOCUMENTS

| JP | 2004-060455 A | 2/2004 |
| JP | 2004-339951 A | 12/2004 |
| JP | 2007-187062 A | 7/2007 |

* cited by examiner

*Primary Examiner* — Sizo Vilakazi
(74) *Attorney, Agent, or Firm* — Oliff PLC (57) ABSTRACT

An internal combustion engine includes a first bank and a second bank. The first bank includes a continuously variable valve apparatus that continuously changes a valve characteristic of an intake valve. The second bank includes a multi-stage variable valve apparatus that changes the valve characteristic in multiple stages. An engine control apparatus adjusts the intake air amount of the first bank by adjusting the valve characteristic that is changed by the continuously variable valve apparatus, based on the intake air amount of the second bank.

6 Claims, 9 Drawing Sheets

INTERNAL COMBUSTION ENGINE AND CONTROL APPARATUS OF THE INTERNAL COMBUSTION ENGINE

TECHNICAL FIELD

The invention relates to an internal combustion engine and an apparatus that controls this internal combustion engine.

BACKGROUND ART

A variable valve apparatus that changes a valve characteristic of an intake valve according to an engine operating state is known, as is described in Patent Document 1, for example.

The variable valve apparatus described in Patent Document 1 includes a variable mechanism portion (intermediate driving mechanism in the document) that changes the valve characteristic of the intake valve, a control shaft that operates the variable mechanism portion, a cam that moves the control shaft in an axial direction, and a motor that rotates the cam. Also, variable control of the valve characteristic is performed by controlling the rotation phase of the cam.

Here, force in an axial direction (hereinafter, referred to as axial force) is applied to the control shaft as a result of reaction force of a valve spring that urges the intake valve, and a rotational moment is generated in the cam by this axial force acting on a cam face. Therefore, with a mechanism that moves the control shaft using a cam, when the motor stops being driven, the cam rotates and the valve characteristic changes. In order to inhibit this kind of change in the valve characteristic, force against the rotational moment must be generated by the motor. Therefore, when using an electric motor as the motor for rotating the cam, a holding current must be supplied to the motor in order to inhibit a change in the valve characteristic.

Therefore, with the apparatus described in Patent Document 1, a section where a displacement amount of the controls shaft changes, and a section where this displacement amount is constant, are provided on the cam face of the cam. That is, a changing region where the valve characteristic changes by the displacement amount of the control shaft changing, and a holding region where the displacement amount of the control shaft is constant and does not change, such that the valve characteristic is kept at a constant value, are provided on the cam face.

When the cam face in this holding region, i.e., the cam face where the distance from the rotational center of the cam is constant, is used, the rotational moment caused by the axial force is inhibited from being generated, so rotation of the cam is suppressed. Therefore, even if the motor stops being driven, the valve characteristic is maintained at a valve characteristic corresponding to the holding region. Thus, a holding current such as that described above can also be reduced, for example. Also, if the rotation phase of the cam falls within the range of the holding region, the valve characteristic is able to be kept at a constant value, so there is no need for highly precise phase control as motor control when keeping the valve characteristic at the constant value, unlike with a variable valve apparatus that is able to continuously change the valve characteristic.

Also, if a plurality of the holding regions described above are provided on the cam face, a plurality of difference valve characteristics are able to be maintained, and the valve characteristics are able to be changed in multiple stages. That is, a variable valve apparatus capable of changing a valve characteristic in multiple stages by selecting a valve characteristic from among a preset plurality of valve characteristics (hereinafter, referred to as a multi-stage variable valve apparatus) is able to be obtained.

PRIOR ART DOCUMENT

Patent Document

Patent Document 1: Japanese Patent Application Publication No. 2004-339951

SUMMARY OF THE INVENTION

Problems to be Solved by the Invention

However, as described above, with a multi-stage variable valve apparatus that changes a valve characteristic in multiple stages, a maintained valve characteristic is changed in a stepped manner. Therefore, unlike a variable valve apparatus that changes a valve characteristic continuously (hereinafter, referred to as a continuously variable valve apparatus), a value of a maintained valve characteristic is unable to be finely adjusted. Therefore, when a multi-stage variable valve apparatus is provided in an internal combustion engine having a plurality of banks such as a V-type internal combustion engine, problems such as those described next, for example, may occur.

That is, when there is a difference in intake air amount between two banks, it is not possible to suppress such a difference in the intake air amount through fine adjustment of the valve characteristic.

This kind of problem may occur not only with a multi-stage variable valve apparatus in which a plurality of holding regions are provided on the cam face, but also similarly with a variable valve apparatus that changes the valve characteristic in multiple stages by another method.

The object of the invention is to provide an internal combustion engine in which a difference in intake air amount between two banks can be suppressed, even when a multi-stage variable valve apparatus is provided in an internal combustion engine having a plurality of banks, and a control apparatus of this internal combustion engine.

Means for Solving the Problems

An internal combustion engine that solves the foregoing problems is an internal combustion engine that is provided with a plurality of banks including a first bank and a second bank, and a variable valve apparatus that is provided for each of the plurality of banks and changes a valve characteristic of an intake valve. The variable valve apparatus provided in the first bank is a continuously variable valve apparatus that continuously changes the valve characteristic. The variable valve apparatus provided in the second bank is a multi-stage variable valve apparatus that changes the valve characteristic in multiple stages by selecting one valve characteristic from among a preset plurality of valve characteristics.

The continuously variable valve apparatus described above is able to continuously change the valve characteristic, so the valve characteristic can be finely adjusted. Therefore, in the internal combustion engine described above, the multi-stage variable valve apparatus that changes the valve characteristic in multiple stages is provided in the second bank, from among the plurality of banks, while the continuously variable valve apparatus that continuously changes the valve characteristic is provided in the first bank, from among the plurality of banks. Therefore, if a difference occurs in the intake air amount between the first and second banks, the intake air amount of the first bank can be adjusted by adjusting the valve characteristic that is changed by the continuously variable valve apparatus, based on the intake air amount of the second bank. Therefore, even if a multi-stage variable valve apparatus is provided in an internal combustion engine having a plurality of banks, a difference in the intake air amount between the first and second banks can be suppressed.

In the internal combustion engine described above, the multi-stage variable valve apparatus includes a variable mechanism portion that changes the valve characteristic of the intake valve, a control shaft that operates the variable mechanism portion, a cam that moves the control shaft in an axial direction, and an electric motor that rotates the cam. Also, a cam face of the cam preferably includes a section where a displacement amount of the control shaft changes, and a plurality of sections where the displacement amount is constant.

Also, in the internal combustion engine described above, the continuously variable valve apparatus preferably includes a variable mechanism portion that changes the valve characteristic of the intake valve, a control shaft that operates the variable mechanism portion, an electric motor, and a conversion mechanism that converts rotary motion of the electric motor into linear motion and moves the control shaft in an axial direction.

A control apparatus of the internal combustion engine described above preferably includes an adjusting portion that adjusts an intake air amount of the first bank by adjusting the valve characteristic that is changed by the continuously variable valve apparatus, based on an intake air amount of the second bank. This control apparatus adjusts the intake air amount of the first bank based on the intake air amount of the second bank, when a difference occurs in the intake air amount between the first and second banks. Therefore, even if a multi-stage variable valve apparatus is provided in an internal combustion engine having a plurality of banks, a difference in the intake air amount between the first and second banks is able to be suppressed.

In the control apparatus of the internal combustion engine described above, the adjusting portion preferably calculates an estimated intake pressure based on an actual intake air amount of the second bank, and adjusts the valve characteristic of the intake valve provided in the first bank, based on a difference between the actual intake pressure of the second bank and the estimated intake pressure.

In the internal combustion engine, there is a correlation between the intake pressure in the intake passage and the intake air amount, in which the intake pressure (absolute pressure) becomes higher as the intake air amount increases. Therefore, the intake pressure of the second bank is able to be estimated based on the actual intake air amount drawn into the second bank.

Here, when there is a difference between the intake pressure estimated based on the intake air amount, and the actual intake pressure, a difference occurs between the intake air amount corresponding to the current value of the valve characteristic and the actual intake air amount, and a difference occurs in the intake air amount between banks due to this difference in the intake air amount. Therefore, the adjusting portion described above calculates the estimated intake pressure based on the actual intake air amount of the second bank. The difference between this estimated intake pressure and the actual intake pressure of the second bank is a value indicative of the difference between an intake air amount that should originally be obtained corresponding to the valve characteristic of the intake valve provided in the second bank and the actual intake air amount, and further, is a value indicative of the difference in the intake air amount between the first and second banks. Also, the adjusting portion adjusts the valve characteristic of the intake valve provided in the first bank, based on this difference between the estimated intake pressure and the actual intake pressure. The intake air amount of the first bank approaches the intake air amount of the second bank, by the valve characteristic of the intake valve provided in the first bank being adjusted in this way. Therefore, a difference in the intake air amount between the first and second banks is able to be suppressed.

When the actual intake air amount becomes small with respect to the intake air amount corresponding to the current value of the valve characteristic (for example, when the intake air amount becomes small compared to when no deposits are adhered, due to deposits or the like adhering to the intake valve, or the like), the actual intake pressure tends to become higher than the estimated intake pressure.

Therefore, in the control apparatus of the internal combustion engine described above, the adjusting portion preferably adjusts the valve characteristic of the intake valve provided in the first bank such that the intake air amount of the first bank becomes smaller as a value obtained by subtracting the actual intake pressure described above from the estimated intake pressure increases. In this case, the valve characteristic of the intake valve provided in the first bank is adjusted such that the intake air amount of the first bank also becomes smaller as the value obtained by subtracting the actual intake pressure from the estimated intake pressure increases, i.e., as the actual intake air amount of the second bank decreases with respect to the intake air amount that should originally be obtained corresponding to the valve characteristic of the intake valve provided in the second bank. Thus, the difference in the intake air amount between the first and second banks is able to be suitably suppressed.

MODES FOR CARRYING OUT THE INVENTION

Hereinafter, an example embodiment of the internal combustion engine and the control apparatus of this internal combustion engine will be described with reference to FIG. 1 to FIG. 12.

Figure 1:
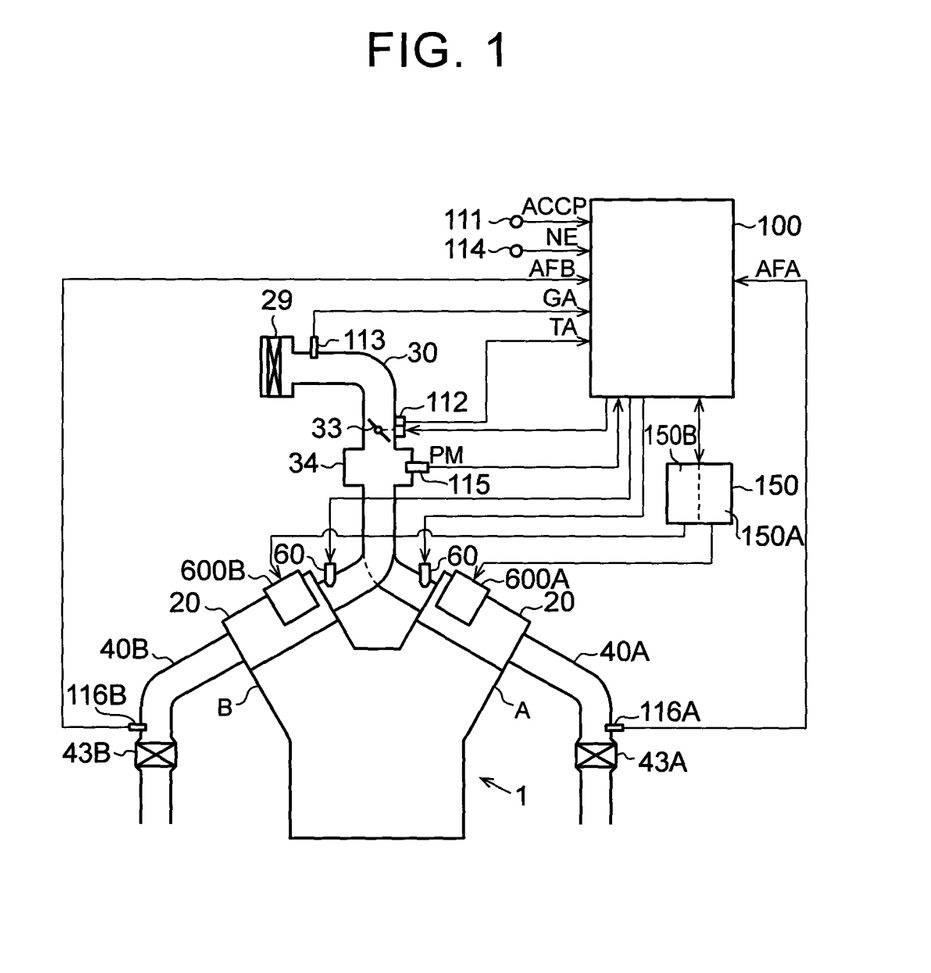
FIG. 1 is a view showing a frame format of the overall structure of an internal combustion engine.

As shown in FIG. 1, an internal combustion engine 1 is a V-type internal combustion engine, and includes a first bank A and a second bank B. The structures of the first bank A and the second bank B are the same except for a portion. Therefore, in the description below, when it is necessary to distinguish between a member provided in the first bank A and a member provided in the second bank B, an "A" will be appended to the end of reference numerals of members provided in the first bank A, and a "B" will be appended to the end of reference numerals of members provided in the second bank B.

An intake passage 30 provided with an air cleaner 29 is connected to the internal combustion engine 1. A surge tank 34 is provided midway in the intake passage 30. Intake air that has flowed into the surge tank 34 is split and flows to both the first bank A and the second bank B, and is introduced into combustion chambers of each bank. Also, an injection valve 60 that injection fuel is provided for each cylinder in the internal combustion engine 1.

A throttle valve 33 is provided upstream of the surge tank 34 in the intake passage 30. Also, an airflow meter 113 that detects an intake air amount GA is provided upstream of the throttle valve 33 in the intake passage 30, and a pressure sensor 115 that detects an intake pressure PMr is provided in the surge tank 34.

A first catalyst 43A that purifies exhaust gas, and a first air-fuel ratio sensor 116A that detects an oxygen partial pressure of exhaust gas before it flows into the first catalyst 43A, are provided in a first exhaust passage 40A that is connected to the first bank A. Similarly, a second catalyst 43B that purifies exhaust gas, and a second air-fuel ratio sensor 116B that detects an oxygen partial pressure of exhaust gas before it flows into the second catalyst 43B, are provided in a second exhaust passage 40B that is connected to the second bank B.

A continuously variable valve apparatus 600A that continuously changes a valve characteristic of an intake valve is provided in a cylinder head 20 of the first bank A, and this continuously variable valve apparatus 600A is drivingly controlled by a first motor control apparatus 150A. Also, a multi-stage variable valve apparatus 600B that changes a valve characteristic of an intake valve in multiple stages is provided in a cylinder head 20 of the second bank B, and this multi-stage variable valve apparatus 600B is drivingly controlled by a second motor control apparatus 150B.

The first motor control apparatus 150A and the second motor control apparatus 150B forms a motor control apparatus 150, and this motor control apparatus 150 performs intercommunication with an engine control apparatus 100.

The engine control apparatus 100 is an apparatus that performs various controls of the internal combustion engine 1. For example, an accelerator operation amount sensor 111 that detects an operation amount (accelerator operation amount ACCP) of an accelerator pedal, and a throttle sensor 112 that detects an opening (throttle opening TA) of the throttle valve 33, are connected to the engine control apparatus 100. Also, the airflow meter 113, the pressure sensor 115, the first air-fuel ratio sensor 116A, the second air-fuel ratio sensor 116B, and a crank angle sensor 114 that detects a rotation angle of a crankshaft of the internal combustion engine 1, and the like are also connected.

The engine control apparatus 100 determines an engine operating state based on signals output from the various sensors described above and the like. Then the engine control apparatus 100 performs various engine controls such as fuel injection control, ignition timing control, and air-fuel ratio feedback control, based on the ascertained engine operating state.

Also, the engine control apparatus 100 variably controls a valve characteristic of an intake valve provided in the first bank A, and a valve characteristic of an intake valve provided in the second bank B, through communication with the motor control apparatus 150.

The engine control apparatus 100 calculates a required intake air amount based on the accelerator operation amount ACCP and an engine speed NE, and calculates a target valve characteristic of an intake valve 31 and a target opening of the throttle valve 33, such that this required intake air amount is obtained. Then, the engine control apparatus 100 controls the opening of the throttle valve 33 based on the target opening, and outputs the target valve characteristic to the motor control apparatus 150. The motor control apparatus 150 performs driving control on the continuously variable valve apparatus 600A and the multi-stage variable valve apparatus 600B such that the valve characteristic of the intake valves 31 provided in the first bank and the second bank come to match the target valve characteristic.

Figure 2:
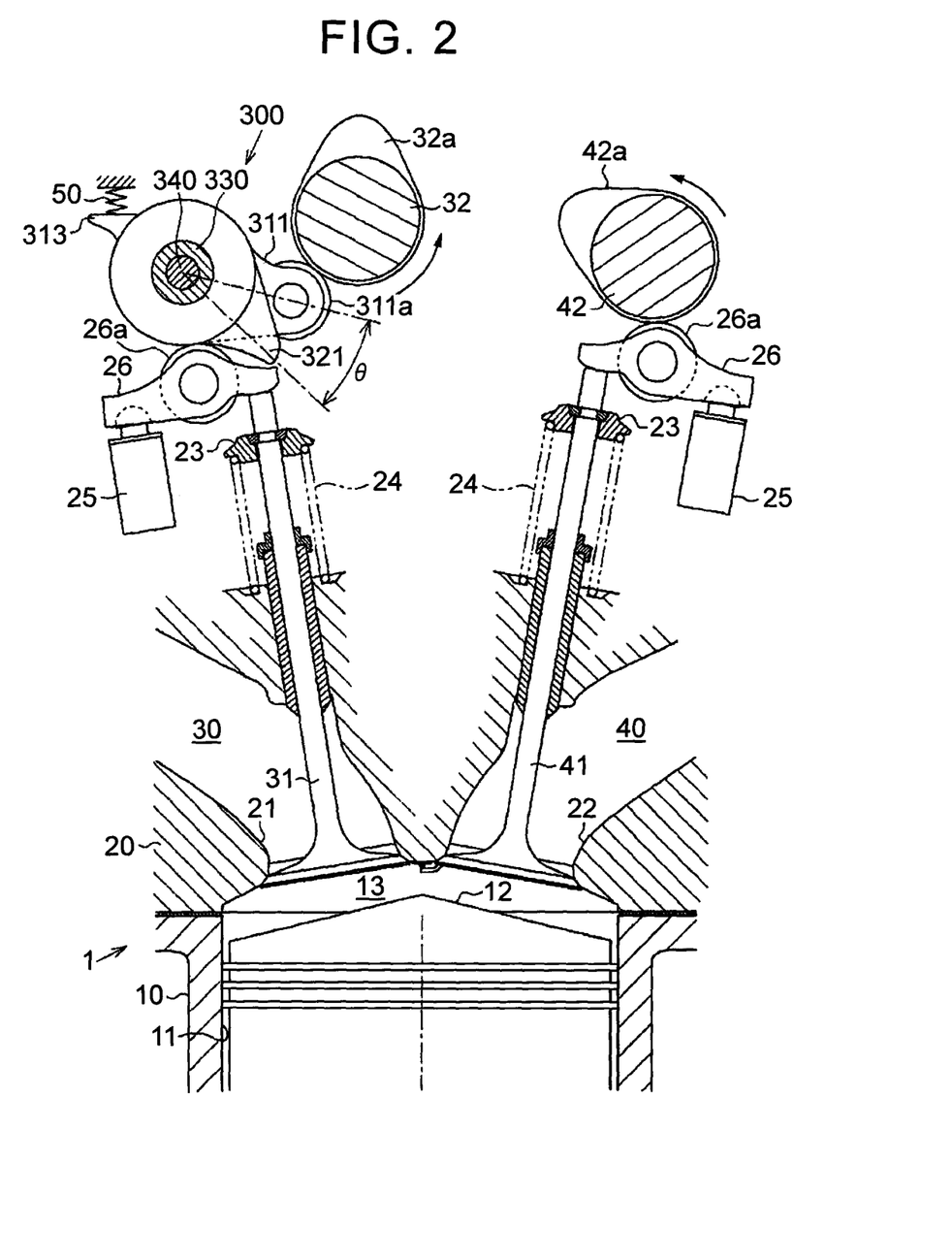
FIG. 2 is a sectional view showing the structure around a cylinder head of the internal combustion engine.

Next, the structure around the cylinder head 20 of the first bank A will be described. The structure of the second bank B is symmetrical to the structure of the first bank A, except for the driving portion of the continuously variable valve apparatus 600A. Therefore, the structures around the cylinder heads 20 of the first bank A and the second bank B are basically the same, except for the driving portions of the continuously variable valve apparatus 600A and the multi-stage variable valve apparatus 600B. Thus, a detailed description of the structure around the cylinder head 20 of the second bank B will be omitted.

As shown in FIG. 2, cylindrical-shaped cylinders 11 according to the number of cylinders, are formed inside a cylinder block 10 of the internal combustion engine 1. A piston 12 is slidably housed in each cylinder 11. The cylinder head 20 is assembled onto an upper portion of the cylinder block 10, and a combustion chamber 13 is defined by an inner peripheral surface of the cylinder 11, an upper surface of the piston 12, and a lower surface of the cylinder head 20.

An intake port 21 and an exhaust port 22 that are communicated with the combustion chamber 13 are formed in the cylinder head 20. The intake port 21 forms a portion of the intake passage 30. Also, the exhaust port 22 forms a portion of an exhaust passage 40.

An intake valve 31 that establishes and blocks communication between the combustion chamber 13 and the intake port 21 is provided in the intake port 21. An exhaust valve 41 that establishes and blocks communication between the combustion chamber 13 and the exhaust port 22 is provided in the exhaust port 22. These valves 31, 41 are each urged in a valve-closing direction by a valve spring 24.

Also, a lash adjuster 25 is provided corresponding to each valve 31, 41, inside the cylinder head 20. Also, a rocker arm 26 is provided between this lash adjuster 25 and each valve 31, 41. A first end portion of the rocker arm 26 is supported by the lash adjuster 25, and a second end portion of the rocker arm 26 is in contact with an end portion of each valve 31, 41.

Furthermore, an intake camshaft 32 and an exhaust camshaft 42 that drive the valves 31, 41 are each rotatably supported by the cylinder head 20. An intake cam 32*a* is formed on the intake camshaft 32, and an exhaust cam 42*a* is formed on the exhaust camshaft 42. An outer peripheral surface of the exhaust cam 42*a* abuts against a roller 26*a* of the rocker arm 26 that is abutted against the exhaust valve 41. As a result, when the exhaust camshaft 42 rotates while the engine is operating, the rocker arm 26 pivots with a portion supported by the lash adjuster 25 as a fulcrum point, by the action of the exhaust cam 42*a*. Then, the exhaust valve 41 is lifted in a valve-opening direction by the pivoting of the rocker arm 26.

Meanwhile, a variable mechanism portion 300 that changes the valve characteristic of the intake valve 31 is provided for each cylinder, between the intake cam 32*a* and the rocker arm 26 that abuts against the intake valve 31. This variable mechanism portion 300 is provided for both the continuously variable valve apparatus 600A and the multi-stage variable valve apparatus 600B.

The variable mechanism portion 300 has an input arm 311 and an output arm 321. The input arm 311 and the output arm 321 are pivotally supported centered around a support pipe 330 that is fixed to the cylinder head 20. The rocker arm 26 is urged toward the output arm 321 side by the urging force of the valve spring 24, and the roller 26*a* provided on an intermediate portion of the rocker arm 26 is abutted against the outer peripheral surface of the output arm 321.

Also, a protrusion 313 is provided on an outer peripheral surface of the variable mechanism portion 300, and urging force of a spring 50 that is fixed inside the cylinder head 20 acts on this protrusion 313. A roller 311*a* provided on a tip end of the input arm 311 is abutted against an outer peripheral surface of the intake cam 32*a*, by the urging force of this spring 50. As a result, when the intake camshaft 32 rotates while the engine is operating, the variable mechanism portion 300 pivots around the support pipe 330 by the action of the intake cam 32*a*. Also, the rocker arm 26 pivots with a portion supported by the lash adjuster 25 as the fulcrum point, by the rocker arm 26 being pushed on by the output arm 321. The intake valve 31 is lifted in the valve-opening direction by the pivoting of this rocker arm 26.

A control shaft 340 that can move in an axial direction of the support pipe 330 is inserted into the support pipe 330. The variable mechanism portion 300 changes a relative phase difference, i.e., an angle θ shown in FIG. 2, between the input arm 311 and the output arm 321 that are centered around the support pipe 330, by displacing the control shaft 340 in the axial direction.

Next, the structure of the variable mechanism portion 300 will be described in more detail with reference to FIG. 3.

Figure 3:
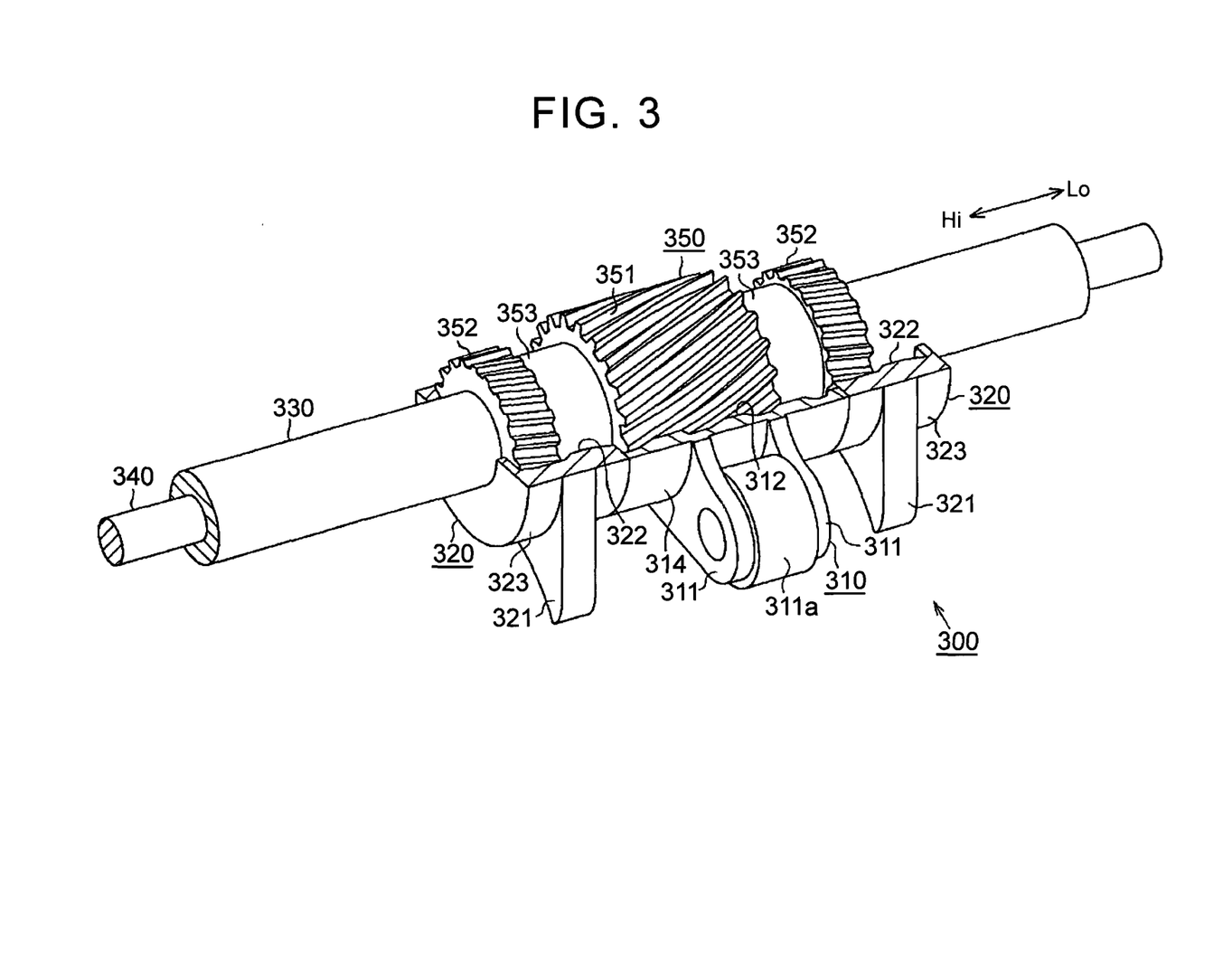
FIG. 3 is a fractured perspective view of a variable mechanism portion.

As shown in this FIG. 3, an output portion 320 is arranged on both sides sandwiching an input portion 310, in the variable mechanism portion 300.

Housings 314, 323 of the input portion 310 and the output portion 320 are each formed in a hollow cylindrical shape, and the support pipe 330 is inserted through these.

A helical spline 312 is formed on an inner periphery of the housing 314 of the input portion 310. Meanwhile, a helical spline 322 in which a tooth trace orientation is opposite that of the helical spline 312 of the input portion 310, is formed on an inner periphery of the housing 323 of the output portion 320.

A slider gear 350 is arranged in a series of internal spaces formed by the housings 314, 323 of the input portion 310 and the two output portions 320. This slider gear 350 is formed in a hollow cylindrical shape, and is arranged reciprocatingly movable in the axial direction of the support pipe 330, and relatively rotatably around the axis of the support pipe 330, on an outer peripheral surface of the support pipe 330.

A helical spline 351 that meshes with the helical spline 312 of the input portion 310 is formed on an outer peripheral surface of an axially center portion of the slider gear 350. Meanwhile, a helical spline 352 that meshes with the helical spline 322 of the output portion 320 is formed on the outer peripheral surface of both axially end portions of the slider gear 350.

The control shaft 340 that is able to move in the axial direction of the support pipe 330 is provided inside the support pipe 330. This control shaft 340 and the slider gear 350 are engaged by a pin, and the slider gear 350 is able to rotate with respect to the support pipe 330, and moves in the axial direction in concert with the movement of the control shaft 340 in the axial direction.

With the variable mechanism portion 300 structured in this way, when the control shaft 340 moves in the axial direction, the slider gear 350 also moves in the axial direction in conjunction with the movement of this control shaft 340. The directions in which the tooth traces of the helical splines 351, 352 formed on the outer peripheral surface of this slider gear 350 are formed each differ, and the helical splines 351, 352 are in mesh with the helical splines 312, 322, respectively, formed on the inner peripheral surfaces of the input portion 310 and the output portion 320. Therefore, when the slider gear 350 moves in the axial direction, the input portion 310 and the output portion 320 rotate in opposite directions from each other. As a result, the relative phase difference between the input arm 311 and the output arm 321 changes, and the maximum lift amount and valve-open period that are valve characteristics of the intake valve 31 change. More specifically, when the control shaft 340 is moved in the direction of arrow Hi shown in FIG. 3, the slider gear 350 moves together with the control shaft 340 in the direction of arrow Hi. With this, the relative phase difference, i.e., the angle θ shown in FIG. 2, between the input arm 311 and the output arm 321, increases, and a maximum lift amount VL and a valve-open period INCAM of the intake valve 31 increase, such that the intake air amount increases. On the other hand, when the control shaft 340 is moved in the direction of arrow Lo shown in FIG. 3, the slider gear 350 moves together with the control shaft 340 in the direction of arrow Lo, and consequently, the relative phase difference between the input arm 311 and the output arm 321 decreases. As a result, the maximum lift amount VL and the valve-open period INCAM of the intake valve 31 decrease, such that the intake air amount decreases.

Figure 4:
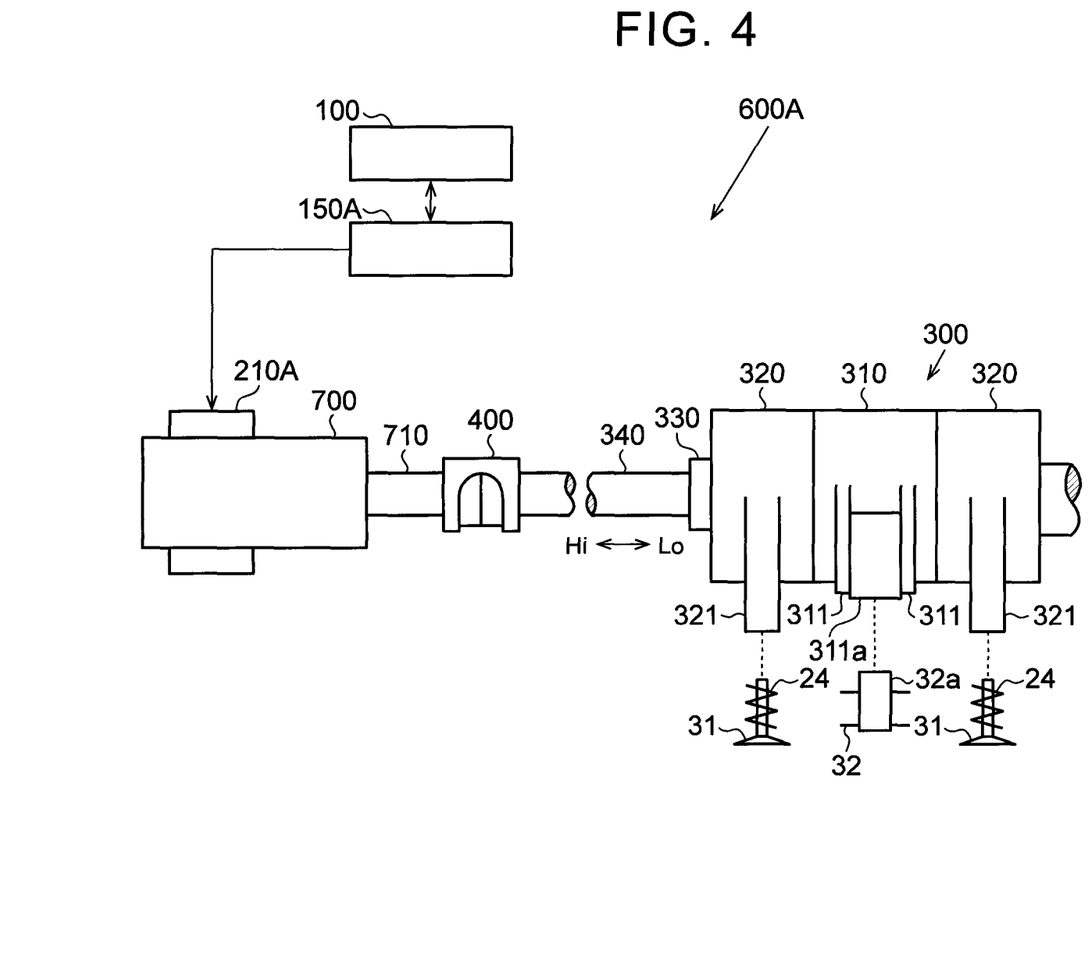
FIG. 4 is a view showing a frame format of a continuously variable valve apparatus.

Next, the structure of a driving portion that drives the control shaft 340 of the continuously variable valve apparatus 600A in the axial direction will be described.

As shown in FIG. 4, the driving portion of the continuously variable valve apparatus 600A includes an electric first motor 210A, and a conversion mechanism 700 that reduces the rotation speed of the first motor 210A and converts the rotary motion of the first motor 210A into linear motion of an output shaft 710, which it then outputs.

A tip end portion of the control shaft 340 and a tip end portion of the output shaft 710 are connected by a connecting member 400. As a result, when the first motor 210A is rotated within a predetermined range, e.g., a rotation angle range of 10 rotations (0 to 3600°), the rotary motion of the first motor 210A is converted into linear motion through the conversion mechanism 700, and transmitted to the control shaft 340 via the output shaft 710. Then, the variable mechanism portion 300 is driven by the control shaft 340 moving in the axial direction.

The first motor 210A is connected to the first motor control apparatus 150A, and the valve characteristics (a maximum lift amount VLA and a valve-open period INCAMA) of the intake valve 31 provided in the first bank A are changed by the rotation angle being controlled according to a drive signal from this first motor control apparatus 150A.

Figure 5:
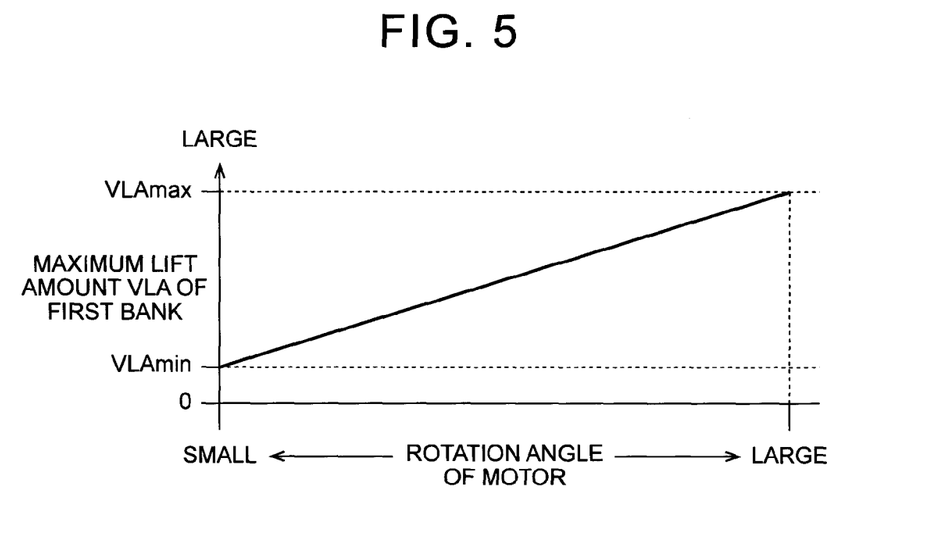
FIG. 5 is a graph showing a manner of change in a maximum lift amount by the continuously variable valve apparatus.

As shown in FIG. 5, the maximum lift amount VLA of the intake valve 31 provided in the first bank A is continuously changed between a minimum value VLmin and a maximum value VLmax, according to the rotation angle of the first motor 210A provided in the continuously variable valve apparatus 600A.

Figure 6:
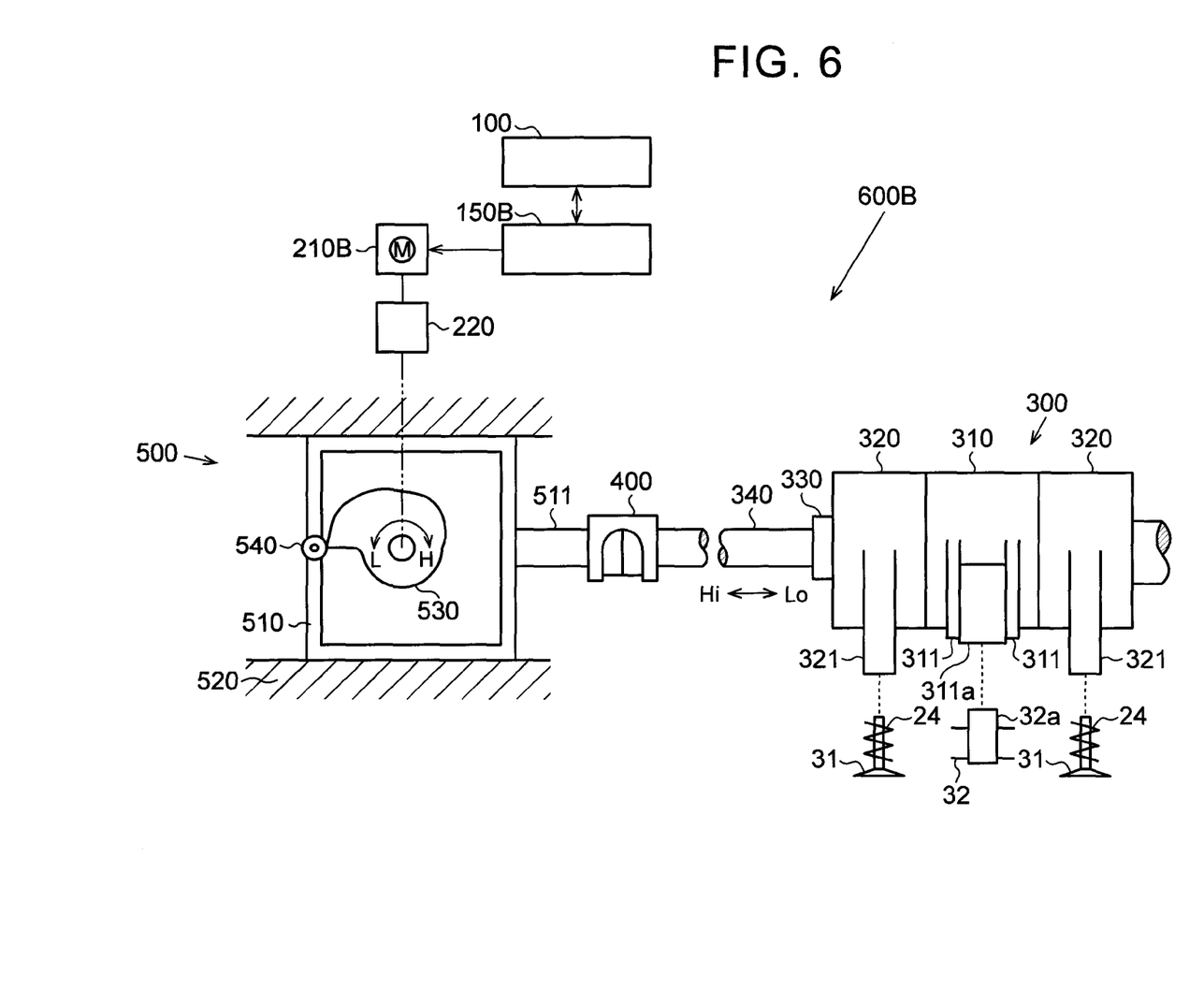
FIG. 6 is a view showing a frame format of a multi-stage variable valve apparatus.

Next, the structure of the driving portion that drives the control shaft 340 of the multi-stage variable valve apparatus 600B in the axial direction will be described.

As shown in FIG. 6, the driving portion of the multi-stage variable valve apparatus 600B includes an electric second motor 210B, a reduction mechanism 220 that reduces a rotation speed of the second motor 210B, and a conversion mechanism 500 that converts rotary motion of the reduction mechanism 220 into linear motion of the control shaft 340, and the like.

The second motor 210B is connected to the second motor control apparatus 150B, and a rotation angle is controlled according to a drive signal from this second motor control apparatus 150B.

Suitable gears or the like are combined in the reduction mechanism 220, and an output shaft of the second motor 210B is connected to an input shaft of the reduction mechanism 220. Meanwhile, an output shaft of the reduction mechanism 220 is connected to a cam 530 that will be described later.

The conversion mechanism 500 includes a holder 510 that reciprocatingly moves along a guide 520. A connecting shaft 511 that extends toward the control shaft 340 is provided on the holder 510, and this connecting shaft 511 and the control shaft 340 are connected by the connecting member 400. The cam 530 that is connected to the output shaft of the reduction mechanism 220 is provided inside the holder 510. Also, a roller 540 that contacts a cam face of the cam 530 is rotatably provided on the holder 510. The holder 510 that is a driven section (a member to which motion of the cam is transmitted) is displaced by the cam 530 rotating, and the control shaft 340 moves in the axial direction by the displacement of this holder 510.

Figure 7:
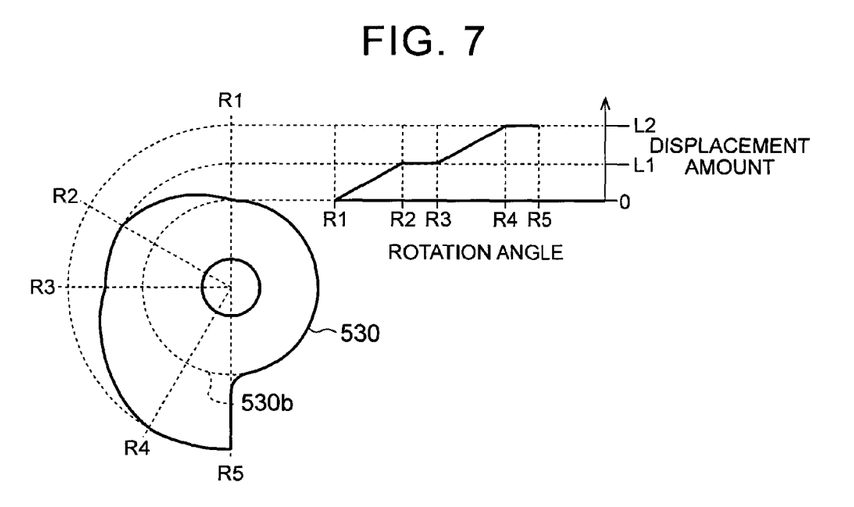
FIG. 7 is a view of a profile of a cam provided in the multi-stage variable valve apparatus.

As shown in FIG. 7, sections (sections from a first rotation angle R1 to a second rotation angle R2, and from a third rotation angle R3 to a fourth rotation angle R4 shown in FIG. 7) in which a displacement amount of the control shaft 340 increases linearly by a radius (the distance from the rotational center of the cam to the cam face) gradually increasing as the rotation angle increases, are provided on the cam face of the cam 530. Also, sections (a section from the second rotation angle R2 to the third rotation angle R3, a section from the fourth rotation angle R4 to a fifth rotation angle R5, and a section before the first rotation angle R1 where the roller 540 contacts a reference circle 530b of the cam 530 shown in FIG. 7) in which the radius is constant and the displacement amount of the control shaft 340 is constant, are also provided on the cam face of the cam 530.

More specifically, in the section where the rotation angle of the cam 530 is before the first rotation angle R1, the displacement amount of the control shaft 340 is maintained at "0". Also, in the section where the rotation angle of the cam 530 is between the second rotation angle R2 and the third rotation angle R3, the displacement amount of the control shaft 340 is maintained at "L1" that is a constant value. Also, in the section where the rotation angle of the control shaft 340 is between the fourth rotation angle R4 and the fifth rotation angle R5, the displacement amount of the control shaft 340 is maintained at "L2" that is a constant value and larger than the "L1". In this way, a section where the displacement amount of the control shaft 340 is constant will hereinafter be referred to as a "holding region".

Figure 8:
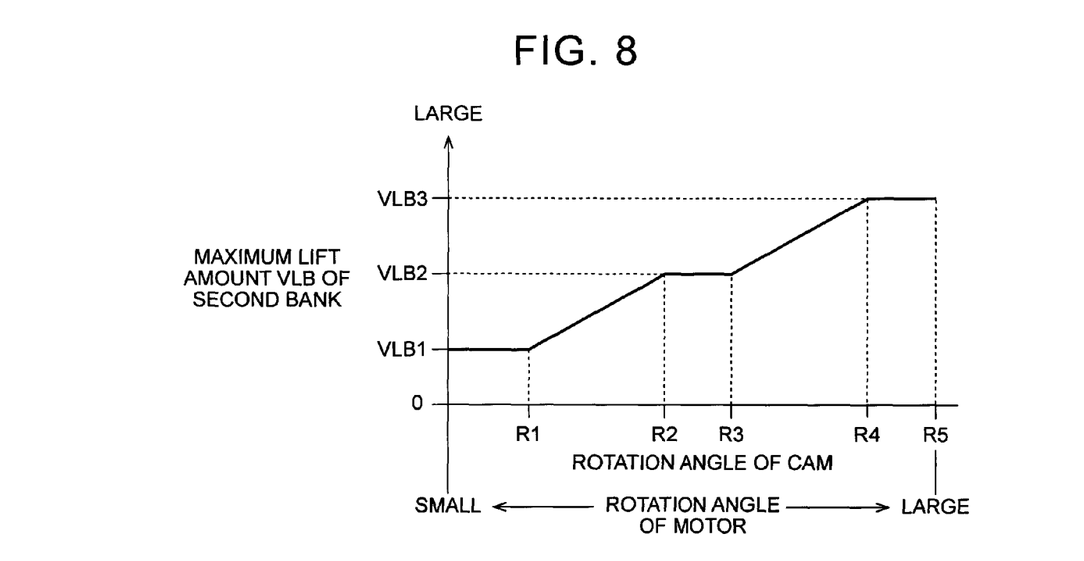
FIG. 8 is a graph showing a manner of change in the maximum lift amount by the multi-stage variable valve apparatus.

The cam face of the cam 530 has the cam profile described above, so a maximum lift amount VLB of the intake valve 31 provided in the second bank B changes as shown in FIG. 8 during one rotation of the cam 530.

As shown in FIG. 8, the rotation angle of the cam 530 also gradually increases as the rotation angle of the second motor 210B increases. Also, in the section before the first rotation angle R1 in which the roller 540 is in a state contacting the reference circle 530b of the cam 530, the displacement amount of the control shaft 340 is "0", and the maximum lift amount VLB at this time is kept at a first lift amount VLB1. This first lift amount VLB1 is the minimum value of the maximum lift amount VLB. Also, in a process in which the rotation angle of the cam changes from the first rotation angle R1 to the second rotation angle R2, the displacement amount of the control shaft 340 gradually increases, so the maximum lift amount VLB gradually increases from the first lift amount VLB1.

In the section where the rotation angle of the cam 530 is between the second rotation angle R2 and the third rotation angle R3, the displacement amount of the control shaft 340 is maintained at the constant "L1", so the maximum lift amount VLB at this time is kept at a second lift amount VLB2 that is larger than the first lift amount VLB1. Also, in a process where the rotation angle of the cam changes from the third rotation angle R3 to the fourth rotation angle R4, the displacement amount of the control shaft 340 gradually increases, so the maximum lift amount VLB gradually increases from the second lift amount VLB2.

In the section where the rotation angle of the cam 530 is between the fourth rotation angle R4 and the fifth rotation angle R5, the displacement amount of the control shaft 340 is maintained at "L2" that is larger than "L1" described above, so the maximum lift amount VLB at this time is kept at a third lift amount VLB3 that is larger than the second lift amount VLB2. This third lift amount VLB3 is the maximum value of the maximum lift amount VLB.

Here, reaction force from the valve spring 24 acts on the output portion 320 of the variable mechanism portion 300, so force that tries to reduce the relative phase difference between the input arm 311 and the output arm 321 is applied. Therefore, axial force is applied in a direction in which the maximum lift amount VLB of the intake valve 31 provided in the second bank B decreases (the direction of arrow Lo shown in FIG. 6), to the slider gear 350 and the control shaft 340. When this axial force is applied to the cam face of the cam 530 in the section that changes the displacement amount of the control shaft 340, a component force of the axial force is applied in a tangential direction of the cam face, and as a result, a rotational moment is generated in the cam 530. Therefore, when attempting to keep the maximum lift amount VLB in the section where the displacement amount of the control shaft 340 changes, a force against this rotational moment must be generated by the second motor 210B, so a holding current must be supplied to the second motor 210B.

On the other hand, when the axial force acts on the cam face in the holding region described above of the cam 530, i.e., when the axial force acts on the cam face in the section where the radius is constant and the displacement amount of the control shaft 340 is constant, the generation of force that is the component force of that axial force and acts in the tangential direction of the cam face is able to be suppressed. Therefore, the holding current supplied to the second motor 210B is able to be reduced when keeping the maximum lift amount VLB in the section where the displacement amount of the control shaft 340 is constant. Also, if the rotation angle of the cam 530 falls within the range of this holding region, the maximum lift amount VLB is able to be kept at a constant value, so highly precise phase control is not necessary as the motor control when keeping the valve characteristic at a constant value, unlike with the continuously variable valve apparatus 600A that is able to continuously change the valve characteristic.

Therefore, with the multi-stage variable valve apparatus 600B, any one of the first lift amount VLB1, the second lift amount VLB2, and the third lift amount VLB3 described above, is selected as the maximum lift amount VLB of the intake valve 31 provided in the second bank B, according to the engine operating state. Also, the maximum lift amount VLB of the intake valve 31 provided in the second bank B is changed in three stages by maintaining the selected maximum lift amount. That is, the engine control apparatus 100 selects any one of the first lift amount VLB1, the second lift amount VLB2, and the third lift amount VLB3, as a target valve characteristic of the intake valve 31 provided in the second bank B, according to the engine operating state.

With the multi-stage variable valve apparatus 600B that changes the valve characteristic in multiple stages, the maintained valve characteristic is changed in a stepped manner. Therefore, unlike the continuously variable valve apparatus 600A that changes the valve characteristic continuously, the value of the maintained valve characteristic is unable to be finely adjusted. Thus, when there is a difference in the intake air amount between the pair of banks (the first bank A and the second bank B), this difference in the intake air amount between the banks is unable to be suppressed through fine adjustment of the valve characteristic with the multi-stage variable valve apparatus 600B.

On the other hand, the continuously variable valve apparatus 600A is able to change the valve characteristic continuously, so the valve characteristic can be finely adjusted. Therefore, in this example embodiment, when there is a difference in the intake air amount between the pair of banks, the intake air amount of the first bank A is adjusted by adjusting the valve characteristic that is changed by the continuously variable valve apparatus 600A, based on the intake air amount of the second bank B, and as a result, a difference in the intake air amount between the pair of banks is suppressed.

Next, a process for suppressing a difference in the intake air amount between the pair of banks (hereinafter, this process will be referred to as an "inter-bank correction") will be described.

Figure 9:
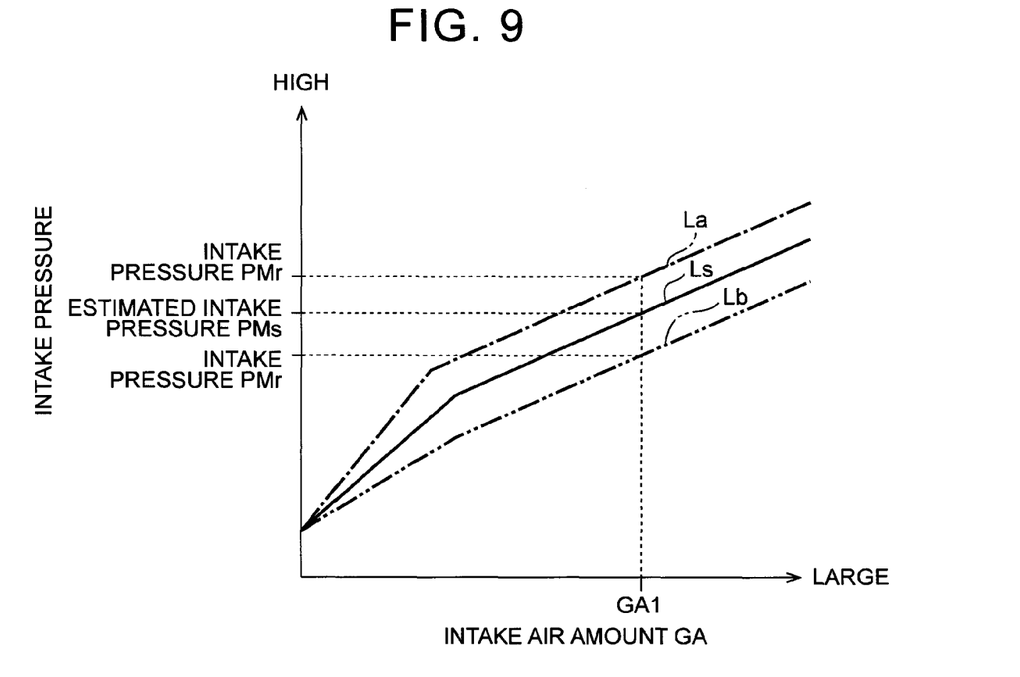
FIG. 9 is a graph showing the relationship between intake air amount and intake pressure.

As shown in FIG. 9, in the internal combustion engine, there is typically a correlation between the intake pressure inside the intake passage and the intake air amount, in which the intake pressure (absolute pressure) increases as the intake air amount becomes larger. The solid line Ls in FIG. 9 shows the relationship between the intake air amount and the intake pressure when there are no deposits or the like adhered to the intake valve, and an intake air amount corresponding to a current value of the valve characteristic of the intake valve is able to be obtained.

Here, when the actual intake air amount is small with respect to the intake air amount corresponding to the current value of the valve characteristic of the intake valve (such as when the actual intake air amount becomes smaller with respect to the intake air amount when no deposits are adhered, due to deposits or the like adhering to the intake valve, for example), the actual intake pressure tends to become greater than an intake pressure PMs estimated from the correlative relationship of the solid line Ls, as shown by the alternate long and short dash line La.

On the other hand, when the actual intake air amount is large with respect to the intake air amount corresponding to the current value of the valve characteristic of the intake valve (such as when the actual valve characteristic is off from the target valve characteristic of the intake valve, and the actual intake air amount is larger than the intake air amount corresponding to the target valve characteristic, for example), the actual intake pressure tends to become lower than the intake pressure PMs estimated from the correlative relationships of the solid line Ls, as shown by the alternate long and two short dashes line Lb.

In this way, an intake pressure corresponding to the intake air amount when no deposits or the like are adhered to the intake valve is calculated as the estimated intake pressure PMs. Then, when this actual intake pressure PMr is higher than the estimated intake pressure PMs, the intake air amount is insufficient by the amount of the pressure difference of these. Conversely, when the actual intake pressure PMr is lower than the estimated intake pressure PMs, the intake air amount is excessive by the amount of the pressure difference of these. Therefore, the difference between the intake air amount corresponding to the current value of the valve characteristic of the intake valve and the actual intake air amount can be calculated by obtaining the difference between the actual intake pressure PMr and the estimated intake pressure PMs, and this kind of difference in the intake air amount can be reduced by adjusting the valve characteristic to compensate for the difference between these intake air amounts.

The engine control apparatus 100 performs an inter-bank correction by calculating a target lift amount VLAp of the intake valve 31 provided in the first bank A using this kind of correlative relationship between the intake pressure and the intake air amount.

Figure 10:
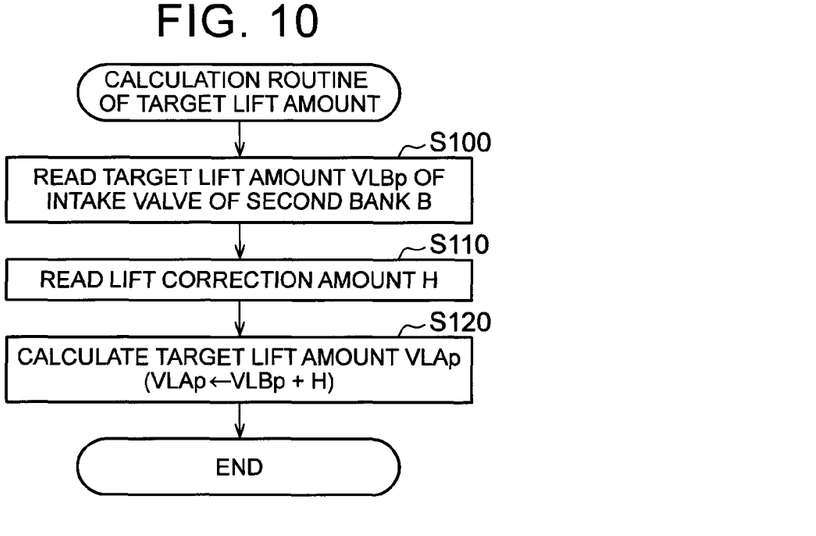
FIG. 10 is a flowchart illustrating a routine when calculating a target lift amount of an intake valve provided in a first bank.

FIG. 10 shows a routine for calculating the target lift amount VLAp of the intake valve 31 provided in the first bank A. This routine is repeatedly executed at predetermined cycles by the engine control apparatus 100 as an adjusting portion.

First, the engine control apparatus 100 reads a target lift amount VLBp of the intake valve 31 provided in the second bank B (S100). Then, the engine control apparatus 100 reads a lift correction amount H (S110). The lift correction amount H is a correction amount for suppressing a difference between the intake air amount of the second bank B and the intake air amount of the first bank A, i.e., a correction amount for performing an inter-cylinder correction. A calculation routine of this lift correction amount H will be described later.

Next, the engine control apparatus 100 calculates a value obtained by adding the lift correction amount H to the target lift amount VLBp of the intake valve 31 provided in the second bank B, as a target lift amount VLAp of the intake valve 31 provided in the first bank A (S120), and this routine temporarily ends.

Figure 11:
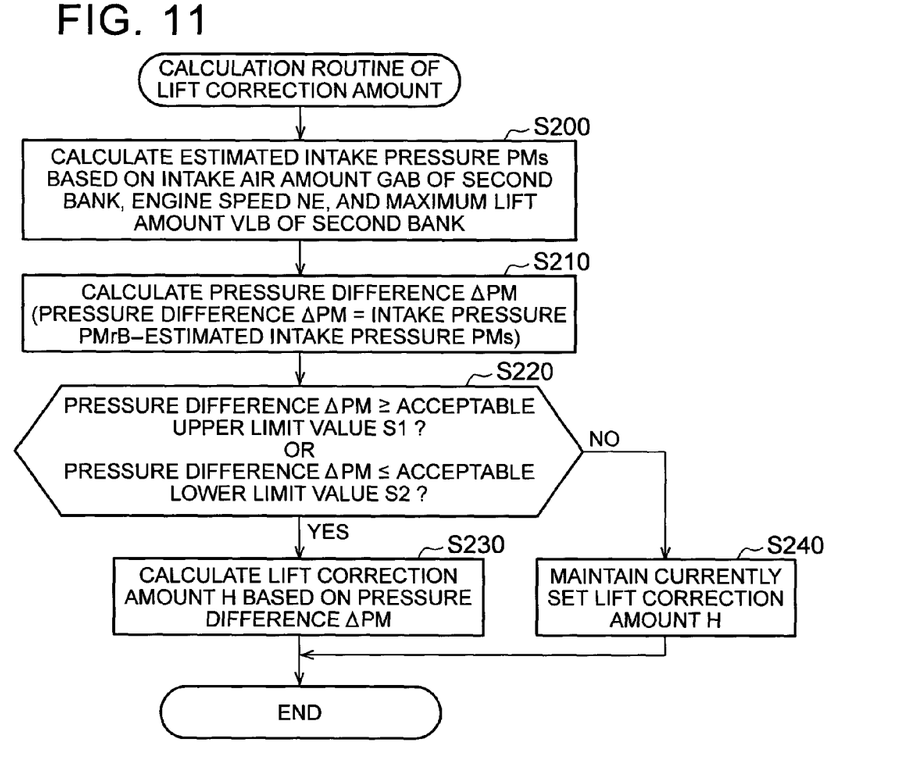
FIG. 11 is a flowchart illustrating a process of a calculation routine of a lift correction amount.

Next, the calculation routine of the lift correction amount H will be described. This routine is also repeatedly executed at predetermined cycles by the engine control apparatus 100.

As shown in FIG. 11, the engine control apparatus 100 first calculates the estimated intake pressure PMs described with FIG. 9 earlier, based on an intake air amount GAB of the second bank B (S200). As described above, the relationship between the intake pressure and the intake air amount indicated by the solid line Ls in FIG. 9 earlier changes according to the engine speed and the valve characteristic. Therefore, in step S200 as well, in order to calculate a more accurate estimated intake pressure PMs, the engine control apparatus 100 calculates the estimated intake pressure PMs based on the intake air amount GAB of the second bank B, the engine speed NE, and the current value of the maximum lift amount LVB of the intake valve 31 of the second bank B. Incidentally, the intake air amount GAB of the second bank B may be obtained by a suitable method. For example, the intake air amount GAB of the second bank B may be obtained based on a detection signal from the airflow meter 113 when a cylinder that forms the second bank B is performing an intake stroke.

Next, the engine control apparatus 100 calculates a pressure difference ΔPM by subtracting the estimated intake pressure PMs from an intake pressure PMrB of the second bank B (S210). When the intake pressure PMrB is higher than the estimated intake pressure PMs, i.e., when the actual intake air amount is small with respect to the intake air amount corresponding to the current value of the valve characteristic of the intake valve 31, the value of the pressure difference ΔPM is a positive value. On the other hand, when the intake pressure PMrB is lower than the estimated intake pressure PMs, i.e., when the actual intake air amount is large with respect to the intake air amount corresponding to the current value of the valve characteristic of the intake valve 31, the value of the pressure difference ΔPM is a negative value. Incidentally, the intake pressure PMrB may be obtained by a suitable method. For example, the intake pressure PMrB may be obtained based on a detection signal from the pressure sensor 115 when a cylinder that forms the second bank B is performing an intake stroke.

Next, the engine control apparatus 100 determines whether the pressure difference ΔPM is equal to or greater than an acceptable upper limit value S1, or whether the pressure difference ΔPM is equal to or less than an acceptable lower limit value S2 (S220). This acceptable upper limit S1 is a positive value, and the size of this value is set such that it can be accurately determined that the actual intake air amount of the second bank B has decreased an unacceptable extent with respect to the intake air amount corresponding to the current value of the valve characteristic of the intake valve 31 provided in the second bank B, based on the fact that the pressure difference ΔPM has increased to equal to or greater than the acceptable upper limit value S1. Also, the acceptable lower limit value S2 is a negative value, and the size of this value is set such that it can be accurately determined that the actual intake air amount of the second bank B has increased an unacceptable extent with respect to the intake air amount corresponding to the current value of the valve characteristic of the intake valve 31 provided in the second bank B, based on the fact that the pressure difference ΔPM has decreased to equal to or less than the acceptable lower limit value S2.

Here, when there is a difference between the intake air amount corresponding to the current value of the valve characteristic of the intake valve 31 provided in the second bank B and the actual intake air amount of the second bank B, a difference in the intake air amount occurs between the banks of the second bank B and the first bank A, due to this difference in the intake air amount.

With the multi-stage variable valve apparatus 600B provided for the second bank B, the maintainable valve characteristic of the intake valve 31 is unable to be finely adjusted, so the difference in the intake air amount of the second bank B is unable to be suppressed through adjustment of the valve characteristic of the intake valve 31 provided in the second bank B. On the other hand, with the continuously variable valve apparatus 600A provided for the first bank A, the valve characteristic of the intake valve 31 is able to be finely adjusted. Therefore, an inter-cylinder correction is performed by adjusting the valve characteristic of the intake valve 31 provided in the first bank A, based on the intake air amount of the second bank B, such that the difference between the intake air amount of the referenced second bank B and the intake air amount of the first bank A becomes smaller.

Figure 12:
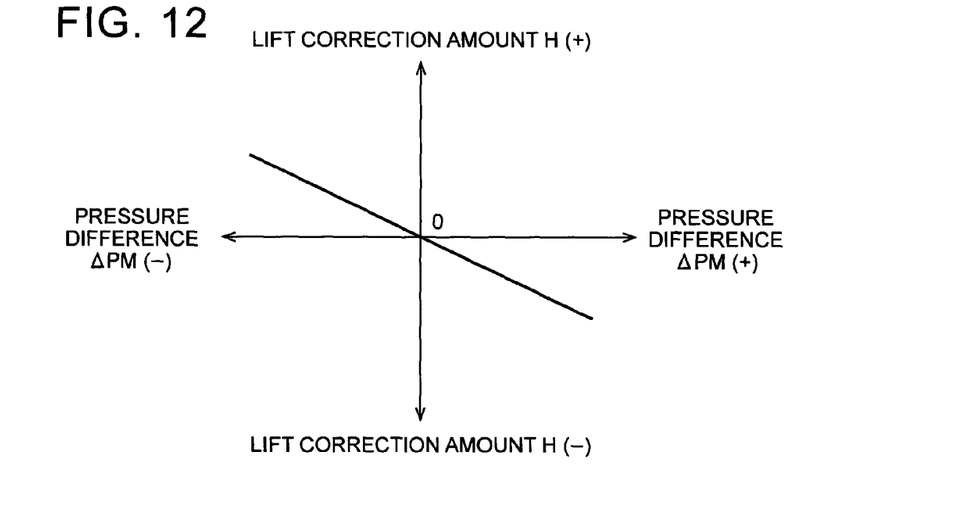
FIG. 12 is a graph showing the relationship between pressure difference and lift correction amount.

When the pressure difference ΔPM is equal to or greater than the acceptable upper limit value S1, or when the pressure difference ΔPM is equal to or less than the acceptable lower limit value S2 in step S220 (220:YES), the lift correction amount H is calculated based on the pressure difference ΔPM (S230) in order to perform the inter-cylinder correction, and this routine temporarily ends. FIG. 12 shows the manner in which the lift correction amount H is set.

As shown in FIG. 12, when the value of the pressure difference ΔPM is a positive value, and the actual intake air amount of the second bank B is small with respect to the intake air amount corresponding to the current value of the valve characteristic of the intake valve 31 provided in the second bank B, the value of the lift correction amount H is set to a negative value and such that the absolute value thereof increases as the absolute value of the pressure difference ΔPM increases. When the lift correction amount H is set to a negative value in this way, the target lift amount VLAp of the intake valve 31 provided in the first bank A becomes smaller through the process in step S120 described above. Therefore, the actual intake air amount of the first bank A decreases according to the lift correction amount H. As a result, the actual intake air amount of the first bank A also becomes smaller, matching the state in which the actual intake air amount of the second bank B has become smaller, with respect to the intake air amount corresponding to the current value of the valve characteristic of the intake valve 31 provided in the second bank B, so the difference in the intake air amount between the banks of the second bank B and the first bank A is able to be suppressed. This decrease in the intake air amount from the change in the valve characteristic is able to be offset by increase-correcting the opening of the throttle valve 33 and increasing the intake air amount.

On the other hand, when the value of the pressure difference ΔPM is a negative value, and the actual intake air amount of the second bank B is large with respect to the intake air amount corresponding to the current value of the valve characteristic of the intake valve 31 provided in the second bank B, the value of the lift correction amount H is set to a positive value and such that the absolute value thereof increases as the absolute value of the pressure difference ΔPM increases. When the lift correction amount H is set to a positive value in this way, the target lift amount VLAp of the intake valve 31 provided in the first bank A becomes larger through the process in step S120 described above. Therefore, the actual intake air amount of the first bank A increases according to the lift correction amount H. As a result, the actual intake air amount of the first bank A also becomes larger, matching the state in which the actual intake air amount of the second bank B has become larger, with respect to the intake air amount corresponding to the current value of the valve characteristic of the intake valve 31 provided in the second bank B, so the difference in the intake air amount between the banks of the second bank B and the first bank A is able to be suppressed. This increase in the intake air amount from the change in the valve characteristic is able to be offset by decrease-correcting the opening of the throttle valve 33 and decreasing the intake air amount.

Next, the operation of this example embodiment will be described.

The continuously variable valve apparatus 600A is able to continuously change the valve characteristic of the intake valve 31, so this valve characteristic is able to be finely adjusted. Therefore, in the internal combustion engine 1, while the multi-stage variable valve apparatus 600B that changes the valve characteristic in stages is provided in the second bank B of the pair of banks, the continuously variable valve apparatus 600A that changes the valve characteristic continuously is provided in the first bank A of the pair of banks. Thus, when there is a difference in the intake air amount between the pair of banks, the intake air amount of the first bank A is able to be adjusted by adjusting the valve characteristic that is changed by the continuously variable valve apparatus 600A, based on the intake air amount of the second bank B.

Hence, in this example embodiment, when there is a difference in the intake air amount between the banks of the first bank A and the second bank B, the intake air amount of the first bank A is adjusted based on the intake air amount of the second bank B. Therefore, even if the multi-stage variable valve apparatus 600B is provided in an internal combustion engine having two banks, a difference in the intake air amount between the pair of banks is able to be suppressed.

Also, the estimated intake pressure PMs is calculated based on the actual intake air amount GAB of the second bank B and the like. The difference (pressure difference $\Delta PM$) between this estimated intake pressure PMs and the intake pressure PMrB that is the actual intake pressure of the second bank B is a value indicative of the difference between the intake air amount that should originally be obtained corresponding to the valve characteristic of the intake valve 31 provided in the second bank B and the actual intake air amount, and further, is a value indicative of the difference in the intake air amount between the pair of banks. Therefore, the lift correction amount H is calculated based on this pressure difference $\Delta PM$ that is the difference between the estimated intake pressure PMs and the intake pressure PMrB, and the maximum lift amount of the intake valve 31 provided in the first bank A is adjusted by this lift correction amount H. The intake air amount of the first bank A approaches the intake air amount of the second bank B by the maximum lift amount of the intake valve 31 provided in the first bank A being adjusted in this way. Therefore, a difference in the intake air amount between the pair of banks is able to be suppressed.

When the actual intake air amount becomes small with respect to the intake air amount corresponding to the current value of the valve characteristic (such as when the intake air amount becomes small compared to when no deposits are adhered, due to deposits or the like adhering to the intake valve 31, for example), the actual intake pressure tends to become higher than the estimated intake pressure PMs.

Therefore, the maximum lift amount of the intake valve 31 provided in the first bank A is adjusted such that the intake air amount of the first bank A becomes smaller when the value of the pressure difference $\Delta PM$ obtained by subtracting the intake pressure PMrB from the estimated intake pressure PMs is a positive value and as the absolute value increases. Therefore, the maximum lift amount of the intake valve 31 provided in the first bank A is adjusted such that the intake air amount of the first bank A also becomes smaller as the value of the pressure difference $\Delta PM$ increases, i.e., as the actual intake air amount of the second bank B decreases with respect to the intake air amount that should originally be obtained corresponding to the maximum lift amount of the intake valve 31 provided in the second bank B. Thus, the difference in the intake air amount between the pair of banks is able to be suitably suppressed.

As described above, the following effects are able to be obtained by this example embodiment.

(1) The continuously variable valve apparatus 600A that continuously changes the valve characteristic of the intake valve is provided for the first bank A of the pair of banks, and the multi-stage variable valve apparatus 600B that changes the valve characteristic in multiple stages by selecting a valve characteristic from among a preset plurality of valve characteristics is provided for the second bank B of the pair of banks. Therefore, even if the multi-stage variable valve apparatus 600B is provided in the internal combustion engine 1 having two banks, a difference in the intake air amount between the pair of banks is able to be suppressed.

(2) The intake air amount of the first bank A is adjusted by adjusting the valve characteristic of the intake valve 31 that is changed by the continuously variable valve apparatus 600A, based on the intake air amount of the second bank B. Therefore, even if the multi-stage variable valve apparatus 600B is provided in the internal combustion engine 1 having two banks, a difference in the intake air amount between the pair of banks is able to be suppressed.

(3) The estimated intake pressure PMs is calculated based on the actual intake air amount GAB of the second bank B, and the valve characteristic of the intake valve 31 provided in the first bank A is adjusted based on the difference between the actual intake pressure PMrB of the second bank B and the estimated intake pressure PMs. Therefore, the intake air amount of the first bank A approaches the intake air amount of the second bank B, so the difference in the intake air amount between the pair of banks is able to be suppressed.

(4) The valve characteristic of the intake valve 31 provided in the first bank A is adjusted such that the intake air amount of the first bank A becomes smaller as the pressure difference $\Delta PM$, which that is a value obtained by subtracting the actual intake pressure PMrB of the second bank B from the estimated intake pressure PMs, increases. Therefore, the difference in the intake air amount between the pair of banks is able to be suitably suppressed.

The example embodiment described above may also be carried out after being modified as described below.

With a change in the valve characteristic by the variable mechanism portion 300, the maximum lift amount VL and the valve-open period INCAM are changed in synchronization. Therefore, in the example embodiment described above, the maximum lift amount VL is adjusted in order to perform an inter-cylinder correction, but the valve-open period INCAM may also be adjusted in a similar manner.

The inter-cylinder correction is performed using the correlative relationship between the intake pressure and the intake air amount, but the inter-cylinder correction may also be performed in another manner. That is, a difference in the intake air amount between the pair of banks can be suppressed even when a multi-stage variable valve apparatus is provided in an internal combustion engine having a plurality of banks, by ascertaining a difference in the intake air amount between the pair of banks, and changing the valve characteristic of the intake valve for which the continuously variable valve apparatus 600A is provided, such that that difference becomes smaller.

The maximum lift amount of the intake valve 31 changed by the multi-stage variable valve apparatus 600B was three stages. Aside from this, a multi-stage variable valve apparatus that changes the maximum lift amount of the intake valve 31 in two stages or four stages or more may also be used.

The shape of the cam 530 described above is one example, and may be another shape as long as the cam is able to move the control shaft 340 in the axial direction.

The structure of the continuously variable valve apparatus 600A is one example. A variable valve apparatus that continuously changes the valve characteristic by another structure may also be used.

The structure of the multi-stage variable valve apparatus 600B is one example. A variable valve apparatus that changes the valve characteristic in a stepped manner by another structure may also be used. For example, when a direct acting type valve system is provided, a valve characteristic can be changed in a stepped manner by providing a variable valve apparatus that changes an operation amount of a valve lifter operated by a cam in multiple stages. Also, when a rocker arm type valve system is provided, a valve characteristic can be changed in a stepped manner by providing a variable valve apparatus that changes a sinking amount of a lash adjuster that supports a rocker arm in multiple stages. Also, when a rocker arm type valve system is provided, a valve characteristic can be changed in a stepped manner by providing a variable valve apparatus that changes the shape of the rocker arm in multiple stages.

The variable mechanism portion 300 described above was a mechanism capable of changing the maximum lift amount and valve-open period of the intake valve 31. Aside from this, the invention may similarly be applied with a mechanism capable of changing only the maximum lift amount, or a mechanism capable of changing only the valve-open period. Also, a variable mechanism portion that changes a valve characteristic different from the maximum lift amount and the valve-open period (for example, a valve-opening timing or a valve-closing timing or the like) may also be used.

The internal combustion engine 1 was an engine provided with two banks, but it may also be an internal combustion engine having three or more banks. Even with an internal combustion engine having three or more banks in this way, operation and effects similar to those of the example embodiment described above can be obtained, by providing both a multi-stage variable valve apparatus and a continuously variable valve apparatus for a pair of banks.

Also, a multi-stage variable valve apparatus is provided for one bank, among three or more banks, and a continuously variable valve apparatus is provided for the other banks. Then, the intake air amount of one bank from among the banks for which the continuously variable valve apparatus is provided is adjusted based on the intake air amount of the one bank for which provided with the multi-stage variable valve apparatus is provided. Then, the inter-cylinder correction described above may be performed, even in an internal combustion engine having three or more banks, by performing this kind of adjustment of the intake air amount for each bank for which the continuously variable valve apparatus is provided.

DESCRIPTION OF THE REFERENCE NUMERALS

1 . . . INTERNAL COMBUSTION ENGINE, 10 . . . CYLINDER BLOCK, 11 . . . CYLINDER, 12 . . . PISTON, 13 . . . COMBUSTION CHAMBER, 20 . . . CYLINDER HEAD, 21 . . . INTAKE PORT, 22 . . . EXHAUST PORT, 24 . . . VALVE SPRING, 25 . . . LASH ADJUSTER, 26 . . . ROCKER ARM, 26a . . . ROLLER, 30 . . . INTAKE PASSAGE, 31 . . . INTAKE VALVE, 32 . . . INTAKE CAMSHAFT, 32a . . . INTAKE CAM, 33 . . . THROTTLE VALVE, 34 . . . SURGE TANK, 40 . . . EXHAUST PASSAGE, 40A . . . FIRST EXHAUST PASSAGE, 40B . . . SECOND EXHAUST PASSAGE, 41 . . . EXHAUST VALVE, 42 . . . EXHAUST CAMSHAFT, 42a . . . EXHAUST CAM, 43A . . . FIRST CATALYST, 43B . . . SECOND CATALYST, 50 . . . SPRING, 60 . . . INJECTION VALVE, 100 . . . ENGINE CONTROL APPARATUS, 111 . . . ACCELERATOR OPERATION AMOUNT SENSOR, 112 . . . THROTTLE SENSOR, 113 . . . AIRFLOW METER, 114 . . . CRANK ANGLE SENSOR, 115 . . . PRESSURE SENSOR, 116A . . . FIRST AIR-FUEL RATIO SENSOR, 116B . . . SECOND AIR-FUEL RATIO SENSOR, 150 . . . MOTOR CONTROL APPARATUS, 150A . . . FIRST MOTOR CONTROL APPARATUS, 150B . . . SECOND MOTOR CONTROL APPARATUS, 210A . . . FIRST MOTOR, 210B . . . SECOND MOTOR, 220 . . . REDUCTION MECHANISM, 300 . . . VARIABLE MECHANISM PORTION, 310 . . . INPUT PORTION, 311 . . . INPUT ARM, 311a . . . ROLLER, 312 . . . HELICAL SPLINE, 313 . . . PROTRUSION, 314 . . . HOUSING, 320 . . . OUTPUT PORTION, 321 . . . OUTPUT ARM, 322 . . . HELICAL SPLINE, 323 . . . HOUSING, 330 . . . SUPPORT PIPE, 340 . . . CONTROL SHAFT, 350 . . . SLIDER GEAR, 351 . . . HELICAL SPLINE, 352 . . . HELICAL SPLINE, 400 . . . CONNECTING MECHANISM, 500 . . . CONVERSION MECHANISM, 510 . . . HOLDER, 511 . . . CONNECTING SHAFT, 520 . . . GUIDE, 530 . . . CAM, 530b . . . REFERENCE CIRCLE, 540 . . . ROLLER, 600A . . . CONTINUOUSLY VARIABLE VALVE APPARATUS, 600B . . . MULTI-STAGE VARIABLE VALVE APPARATUS, 700 . . . CONVERSION MECHANISM, 710 . . . OUTPUT SHAFT.

The invention claimed is:
1. An internal combustion engine comprising:
a plurality of banks including a first bank and a second bank, and
a variable valve apparatus provided for each of the plurality of banks, the variable valve apparatus being configured to change a valve characteristic of an intake valve, the variable valve apparatus provided in the first bank being a continuously variable valve apparatus that continuously changes the valve characteristic, and the variable valve apparatus provided in the second bank being a multi-stage variable valve apparatus that changes the valve characteristic in multiple stages by selecting one valve characteristic from among a preset plurality of valve characteristics.

2. The internal combustion engine according to claim 1, wherein the multi-stage variable valve apparatus includes a variable mechanism portion that changes the valve characteristic of the intake valve, a control shaft that operates the variable mechanism portion, a cam that moves the control shaft in an axial direction, and an electric motor that rotates the cam and a cam face of the cam includes a section where a displacement amount of the control shaft changes, and a plurality of sections where the displacement amount is constant.

3. The internal combustion engine according to claim 1, wherein the continuously variable valve apparatus includes a variable mechanism portion that changes the valve characteristic of the intake valve, a control shaft that operates the variable mechanism portion, an electric motor, and a conversion mechanism that converts rotary motion of the electric motor into linear motion and moves the control shaft in an axial direction.

4. A control apparatus of the internal combustion engine according to claim 1, comprising:

an adjusting portion configured to adjust an intake air amount of the first bank by adjusting the valve characteristic that is changed by the continuously variable valve apparatus, based on an intake air amount of the second bank.

5. The control apparatus of the internal combustion engine according to claim 4, wherein the adjusting portion calculates an estimated intake pressure based on an actual intake air amount of the second bank, and adjusts the valve characteristic of the intake valve provided in the first bank, based on a difference between an actual intake pressure of the second bank and the estimated intake pressure.

6. The control apparatus of the internal combustion engine according to claim 5, wherein the adjusting portion adjusts the valve characteristic such that the intake air amount of the first bank becomes smaller as a value obtained by subtracting the estimated intake pressure from the actual intake pressure increases.

* * * * *

UNITED STATES PATENT AND TRADEMARK OFFICE
CERTIFICATE OF CORRECTION

PATENT NO. : 9,435,272 B2  
APPLICATION NO. : 14/437020  
DATED : September 6, 2016  
INVENTOR(S) : Fuminori Hosoda Page 1 of 1

It is certified that error appears in the above-identified patent and that said Letters Patent is hereby corrected as shown below:

On the Title Page

For the city of the (73) Assignee, please delete "Tokyo (JP)" and insert --Toyota (JP)--, therefore.

Signed and Sealed this  
Twenty-second Day of November, 2016

Michelle K. Lee  
*Director of the United States Patent and Trademark Office*